May 12, 1970 F. M. LATHROP II 3,511,272
FLOW-T CONSTRUCTION
Filed Dec. 11, 1967

INVENTOR.
FRANCIS M. LATHROP, II
BY
Flehr, Hohbach, Test
Albritton & Herbert
ATTORNEYS

United States Patent Office 3,511,272
Patented May 12, 1970

3,511,272
FLOW-T CONSTRUCTION
Francis M. Lathrop II, Houston, Tex., assignor to M & J Valve Company, Houston, Tex., a corporation of Delaware
Filed Dec. 11, 1967, Ser. No. 689,627
Int. Cl. B01d 35/02
U.S. Cl. 137—544                                   5 Claims

ABSTRACT OF THE DISCLOSURE

A flow-T construction for connecting the main line of a pipe system with a branch line. The T includes a shell having opposite ends secured to aligned horizontal inlet and outlet conduits. Within the shell the inlet conduit has an upwardly sloped portion which lifts a flow separating sphere before it is delivered into the interior of the shell. The outlet conduit likewise has a portion which is upwardly sloped and which elevates the sphere before it is introduced into the outlet conduit. Downwardly sloped ramp means extends between the two conduit portions, whereby a sphere rolls by gravity from one conduit portion to the other. A branch conduit communicates through one side of the shell and is adapted to be connected to a branch line. Barrier means prevents the sphere from entering the branch conduit.

BACKGROUND OF THE INVENTION

Pipe line systems for the handling of various petroleum products commonly employ so-called "flow-T's" which are located in the main line and which permit flow to enter or be diverted from the main line. It is customary in the operation of pipe line systems to use so-called spheres which have a normal diameter slightly greater than the internal diameter of the pipe line and which may serve to separate one material from another. Also it is desirable to use so-called cleanout devices which are passed through the pipe line to remove accumulated deposits. It is of importance that the flow-T's employed in such a pipe line system be such as will permit the passage of spheres or cleanout devices without interfering with normal operation of the system, and without the sphere or cleanout device being accidentally carried into the branch line. Thus it has been common to utilize barrier means whereby a sphere in its transit through the flow-T cannot enter the branch line.

Constructions which have been used in the past for flow-T's have not been entirely satisfactory. Particularly where the flow is being diverted through the branch line of a T, there is a tendency for a sphere or clean-out device to assume a position such that it interferes with flow through the branch line and does not maintain a desired separation between materials. Also prior forms of flow-T's have been somewhat difficult and expensive to install in pipe lines, since they frequently require the upstream and downstream portions of the line to be offset or they require the use of bends or other fittings.

SUMMARY OF THE INVENTION

This invention relates generally to pipe line systems, and particularly to flow-T's used in such systems. In particular, it pertains to flow-T's constructed in such a manner as to handle clean-out devices or spheres, such as are commonly used in such systems.

In general it is an object of the invention to provide a flow-T which will prevent the lodging of a sphere or clean-out device in such a manner as to obstruct or interfere with flow through the branch conduit.

Another object of the invention is to provide a flow-T of relatively simple construction which can be directly connected in horizontal upstream and downstream portions of a pipe line without offsetting.

An additional object of the invention is to generally improve upon flow-T's suitable for pipe line systems.

Additional objects and features of the invention will appear from the following description in which the preferred embodiment has been set forth in detail in conjunction with the accompanying drawing.

More specifically, the flow-T comprising the present invention consists of a substantially cylindrical horizontal shell having an internal diameter substantially greater than the internal diameter of the pipe line with which the T is to be used. Inlet and outlet conduits extend into the opposite end portions of the shell and are secured thereto. A branch conduit also connects through one side of the shell. Within the shell there is an upwardly sloped conduit portion which communicates with the inlet conduit and which serves to lift a sphere before it is delivered into the interior of the shell. Also within the shell there is a second upwardly sloped conduit portion which communicates with the outlet conduit and which again lifts the sphere before it is delivered into the outlet conduit. Downwardly sloped ramp means extends between the two conduit portions and barrier means extends across the opening of the branch conduit. A sphere tends to roll down the ramp means by gravity whereby it does not come to rest in a position in which it obstructs flow through the branch conduit. Also a sphere tends to come to rest in a position adjacent the outlet conduit portion, whereby it maintains a separation between materials and is carried into the outlet conduit when a relatively small pressure differential is applied.

DESCRIPTION OF THE PREFERRED EMBODIMENT

Figure 1:
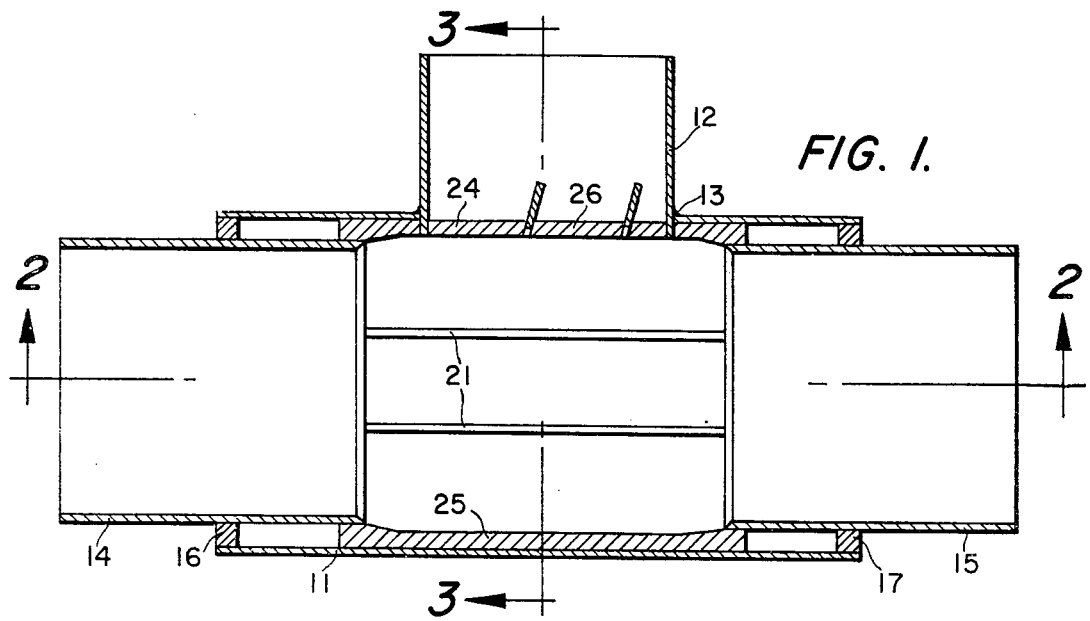
FIG. 1 is a plan view in section taken along the line 1—1 of FIG. 3.
Figure 2:
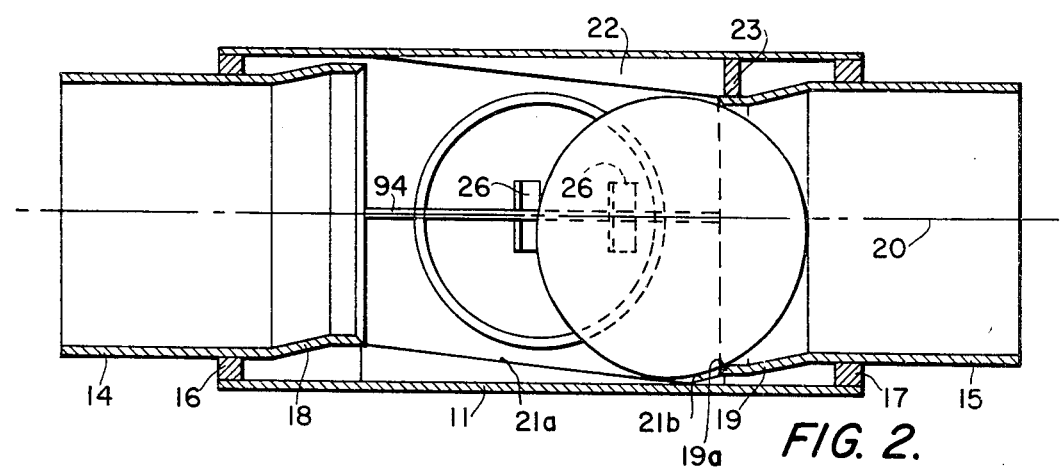
FIG. 2 is a cross-sectional view taken along the line 2—2 of FIG. 1.
Figure 3:
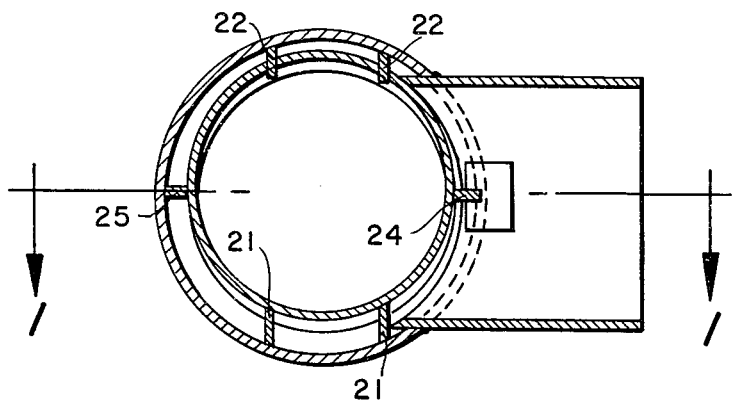
FIG. 3 is a cross-sectional view taken along the line 3—3 of FIG. 1.

The flow-T illustrated in the drawing consists of a horizontal cylindrical shell 11 which has an internal diameter substantially greater than the internal diameter of the pipe line with which it is used. It has a side opening which communicates with the branch or side conduit 12. Assuming the use of fabricated construction, these parts can be secured by welding 13. The inlet and outlet conduits 14 and 15 are in axial alignment and represent either portions of the main line or conduits which are attached as by couplings or welding to adjacent parts of the main line. Conduits 14 and 15 are fixed within the end portions of the shell 11 by the rings 16 and 17. Within the shell the inlet conduit 14 merges with an upwardly sloped conduit portion 18 which in effect lifts the sphere before it is delivered into the interior of the shell. The outlet conduit 15 likewise merges with an inner portion 19 which receives the sphere and which is sloped to elevate the sphere back into alignment with the center line 20 of the T.

At the lower side of the shell 11 ramp bars 21 extend from the extremity of the portion 18 to the corresponding extremity of the portion 19. These ramp bars have sloping upper edges whereby a sphere resting upon these bars is caused to roll by gravity toward the portion 19. At the upper side of the shell 11 there are guide bars 22, the lower edges of which slope downwardly from the region of portion 18 to the region of portion 19. Portion 19 may be braced by the eccentric ring 23. Guide bars 24 and 25 are attached to the shell and extend along the sides. Bar 24 extends across the opening of conduit 12 and serves as a barrier to prevent spheres from being drawn into this conduit by fluid flow. It is desirable to provide one or more flow-deflecting vanes 26 upon the bar 24. These vanes 26 serve to deflect the flow into conduit 12 when this conduit connects with the suction side of a station pump. In general they serve to direct the flow and thereby reduce flow resistance.

With respect to bars 21 it is preferable to provide edges 21a and 21b that slope in opposite directions. The edges 21b extend to conduit portion 19 and are relatively short.

The flow-T described above operates as follows. Assuming that all of the flow is occurring through the line conduits 14 and 15 and that no flow is being diverted through the conduit 12, when a sphere 28 (e.g., a ball made of synthetic rubber) is received in the conduit portion 14 it is elevated before it is deposited upon the bars 21. Once the sphere has been discharged from portion 18, there is ample space about the sphere through which the main flow may occur. The sphere tends to roll down the bars 21 by gravity until it reaches the lip 19a of portion 19. Here the sphere when acted upon by fluid pressure differential enters the portion 19, and after being elevated it continues to pass through the conduit 15. Assuming now that the flow is being diverted through the conduit 12 and that no flow is occurring through the conduit 15, the sphere after being deposited within the shell 11 again rolls down the ramp 21 until it contacts the lip 19a of portion 19. Thus it does not remain in a position where it may partially block flow being diverted through the side conduit 12. However, when flow through the side conduit 12 is reduced or shut off and flow re-established through the conduit 15, differential fluid pressure is immediately applied to the sphere to cause it to enter the portion 19 and continue on down the line. By virtue of the slope of the edges 21a and 21b of ramp bars 21, a sphere disposed adjacent the circular lip 19a has its center aligned with the center of the lip. Therefore its initial movement into portion 19 is horizontal.

It will be evident that the flow-T described above overcomes the deficiencies of flow-T's used in the past. It facilitates the establishment of flow through a branch pipe line connected to the conduit 12 without such flow being in any way obstructed by presence of a sphere, and it ensures application of differential pressure to a sphere when flow through the side line is reduced or shut off and flow reestablished through the main outlet. Installation of the flow-T is relatively simple, particularly in that the inlet and outlet conduits 14 and 15 are on a common horizontal axis for making direct connection with associated piping.

What I claim is:

1. A flow-T for use in pipe line systems to connect a main line with a branch line, the pipe line being one adapted to receive material separating spheres, a horizontal cylindrical shaped shell, aligned inlet and outlet conduits extending into end portions of the shell and secured thereto, the internal diameter of the shell being substantially greater than the internal diameter of the conduits, a branch conduit communicating through one side of the shell, an upwardly sloped conduit portion within the shell and connected to the inner end of the inlet conduit, an upwardly sloped conduit portion within the shell and connected to the inner end of the outlet conduit, barrier means preventing movement of a sphere through the branch conduit, and downwardly sloped ramp means extending between the inner ends of said portions and serving as a ramp upon which a sphere may roll between said portions.

2. A flow-T as in claim 1 in which said ramp means consists of a plurality of bars having their upper edges sloped downwardly.

3. A flow-T as in claim 1 together with flow deflecting means carried by said barrier means and serving to direct flow into said branch conduit.

4. A flow-T as in claim 1 together with guide bars extending along the upper side of the shell between said portions, said bars having downwardly sloped lower edges.

5. A flow-T as in claim 1 in which said ramp means is disposed to cause a sphere to come to rest adjacent the outlet conduit portion and with its center in horizontal alignment with the same.

References Cited

UNITED STATES PATENTS

| 2,457,041 | 12/1948 | Harza | 285—156 XR |
| 3,091,483 | 5/1963 | Hruby | 285—156 XR |
| 3,166,094 | 1/1965 | Eagleton | 137—544 |

FOREIGN PATENTS

| 964,683 | 7/1964 | Great Britain. |

HAROLD W. WEAKLEY, Primary Examiner

U.S. Cl. X.R.

285—156